United States Patent [19]

Ablov et al.

[11] Patent Number: 4,868,916
[45] Date of Patent: Sep. 19, 1989

[54] EXCESSIVE GROUND-CLOSURE RATE ALARM SYSTEM FOR AIRCRAFT

[75] Inventors: Boris Ablov; Moshe Sabato, both of Jerusalem, Israel

[73] Assignee: Israel Aircraft Industries, Inc., Lod, Israel

[21] Appl. No.: 610,013

[22] Filed: May 14, 1984

[30] Foreign Application Priority Data

May 20, 1983 [IL] Israel .................................. 68737

[51] Int. Cl.⁴ .......................................... G08B 21/00
[52] U.S. Cl. ...................... 340/970; 73/178 T; 340/963; 364/433
[58] Field of Search ............... 340/959, 963, 964, 967, 340/969–970; 364/433, 463; 73/178 H, 178 T; 244/180

[56] References Cited

U.S. PATENT DOCUMENTS

| 2,809,340 | 10/1957 | Bernhart | 318/489 |
| 2,930,035 | 3/1960 | Altekruse | 343/7 |
| 3,348,412 | 10/1967 | Lode | 73/178 H |
| 3,715,718 | 2/1973 | Astengo | 340/27 R |
| 3,925,751 | 12/1975 | Bateman et al. | 340/27 AT |
| 3,934,222 | 1/1976 | Bateman et al. | 340/27 AT |
| 3,936,796 | 2/1976 | Bateman | 340/27 AT |
| 3,944,968 | 3/1976 | Bateman et al. | 340/970 |
| 3,958,218 | 5/1976 | Bateman | 340/27 R |
| 3,958,219 | 5/1976 | Bateman et al. | 340/27 R |
| 3,988,713 | 10/1976 | Bateman | 340/27 R |
| 4,027,838 | 6/1977 | Barnum et al. | 73/178 H |
| 4,030,065 | 6/1977 | Bateman | 340/970 |
| 4,060,793 | 11/1977 | Bateman | 343/27 AT |
| 4,071,894 | 1/1978 | Schuldt | 340/970 |
| 4,110,605 | 8/1978 | Miller | 364/463 |
| 4,189,777 | 2/1980 | Kuntman | 364/433 |
| 4,293,840 | 10/1981 | Hadari | 340/27 AT |

FOREIGN PATENT DOCUMENTS 1567554 5/1980 United Kingdom ............... 340/970

Primary Examiner—Joseph A. Orsino
Assistant Examiner—Brent A. Swarthout
Attorney, Agent, or Firm—Sigalos, Levine & Montgomery

[57] ABSTRACT

An alarm means including a digital microcomputer having a memory programmed for storing a look-up table defining an alarm envlope which, above a predetermined altitude, is based on a relationship between altitude and ground-closure rate which is independent of ground velocity, and below said predetermined altitude, is based on a relationship between altitude and ground-closure rate which is dependent on ground velocity.

6 Claims, 16 Drawing Sheets

A. MAIN CYCLE

- UPDATE ALTITUDE SET — A1
- COMPUTE DESCENT RATE AND ALTITUDE EXPECTED AFTER PILOT'S DELAY — A2
- ENTER GROUND SPEED — A3
- COMPUTE ALARM ENVELOPE — A4
- PRODUCE ALARM IF NEEDED — A5

FIG 5

A1. UPDATE ALTITUDE SET

- COMPUTE AVERAGE ALTITUDE VALUE — A1.1
- SHIFT BOTH ALTITUDE SETS — A1.2
- SAMPLE PRIMARY SET OF ALTITUDE VALUES — A1.3

FIG 6

NOTES:
1. DELTAT = PILOT REACTION TIME / MAIN CYCLE TIME
2. HA – AVERAGE HEIGHT VALUE IN ITH MAIN CYCLE
3. $\dot{H}A_I = HA_I - HA_{I-1}$
4. $\ddot{H}A_I = \dot{H}A_I - \dot{H}A_{I-1}$
5. $\ddot{H}A_I$ IS SUPPOSED TO BE CONSTANT FOR ALL THE PERIOD FROM ITH CYCLE TILL PREDICTED INSTANT

NOTES:

1. DELTAT = PILOT REACTION TIME / MAIN CYCLE TIME
2. HA - AVERAGE HEIGHT VALUE IN ITH LOOP
3. COMPUTATION BASE IS ABOUT HALF PILOT REACTION DELAY, HERE FOUR MAIN CYCLES
4. THE AVERAGE IN COMPUTATION BASE DESCENT RATE IS SUPPOSED TO BE CONSTANT FOR ALL THE PREDICTION PERIOD

NOTES:

1. $H_E, \dot{H}_E$ — EXPECTED (PREDICTED) VALUES OF HEIGHT AND CLOSURE RATE RESPECTIVELY
2. $H_T, I$ — TEMPORARY VALUES USED FOR CALCULATION
3. $\Delta H = H_{I+1} - H_I$ — CONSTANT VALUE, SEE FIG 3 ALARM ENVELOPE
4. $H_0, \dot{H}_I, V_0, \dot{H}_m, \dot{H}_V, H_m, V_m, \dot{H}_V, \dot{H}_0$ — SEE FIG 3 ALARM ENVELOPE
5. R,S — PARAMETERS USED IN THE SUBROUTINE A5 (ALARM PRODUCING)

EXCESSIVE GROUND-CLOSURE RATE ALARM SYSTEM FOR AIRCRAFT

BACKGROUND OF THE INVENTION

The present invention relates to alarm systems for aircraft, and particularly to such systems which actuate an alarm when the ground-closure rate of the aircraft is found to be excessive.

A number of excessive ground-closure rate alarm systems have been proposed for use in aircraft in order to actuate an alarm, and thereby to alert the pilot, if the ground-closure rate (sometimes called descent rate) is found to be excessive such that there is a danger of collision with the ground. Examples of such systems are described in the U.S. Pat. Nos. 2,809,340; 2,930,035; 3,715,718; 3,925,751; 3,934,222; 3,936,796; 3,958,218-9, 3,988,713; 4,060,793; and 4,293,840. These systems usually include altitude measuring means for measuring the altitude of the aircraft, means for computing therefrom the ground-closure rate, and alarm means for producing an alarm when the computed ground-closure rate is excessive for the particular altitude. Most of these known systems have been designed for use by fixed-wing aircraft.

An object of the present invention is to produce a novel excessive ground-closure rate alarm system having a number of advantages over the known systems, particularly when used by helicopters.

BRIEF SUMMARY OF THE INVENTION

According to one broad aspect of the present invention, the alarm means includes a digital microcomputer having a memory programmed for storing a look-up table defining an alarm envelope which, above a predetermined altitude, is based on a relationship between altitude and ground-closure rate which is independent of ground velocity, and below said predetermined altitude, is based on a relationship between altitude and ground-closure rate which is dependent on ground velocity.

According to another aspect of the present invention, the altitude measuring means includes compensating means for compensating the measured altitude by the aircraft orientation. More particularly, in the described system the altitude measuring means includes a radar altimeter carried on the aircraft, and the compensating means includes aircraft pitch measuring means for measuring the pitch of the aircraft, means for determining from said latter measurement the height of the altimeter with respect to the center of gravity of the aircraft, and means for summing said latter-determined height with said altimeter-measured height to compensate the altimeter-measured height for the orientation of the aircraft.

The foregoing features have been found to be particularly advantageous when the system is used in helicopters.

According to another aspect of the invention, the altitude measuring means includes means for cyclically measuring the instantaneous altitude of the aircraft; and means for computing therefrom the predicted altitude after the elapse of the predetermined time delay to compensate for pilot's reaction time, such that said computed ground-closure rate, and said altitude with respect to which it is compared for excessiveness, are both the predicted values after the elapse of said predetermined time delay. Such an arrangement has been found advantageous since it compensates for pilot's reaction time.

According to another aspect of the invention, the digital microcomputer comprises: means for setting an alarm flag when the aircraft is within the alarm envelope; and means for actuating the alarm only when a predetermined number, greater than one, of alarm flags have been set during a previous predetermined number of cycles. Such an arrangement has been found to reduce the number of false alarms, and therefore to enhance the integrity of the alarm when it is actuated.

Further features and advantages of the invention will be apparent from the description below.

BRIEF DESCRIPTION OF THE DRAWINGS

The invention as herein described, by way of example only, with reference to the accompanying drawings, wherein:

FIG. 5 is a flow diagram illustrating the main cycle of operation of the system of FIG. 1;

FIG. 6 is a flow diagram illustrating the "Update Altitude Set" operation in the main cycle of FIG. 5;

DESCRIPTION OF A PREFERRED EMBODIMENT Overall System

Figure 1:
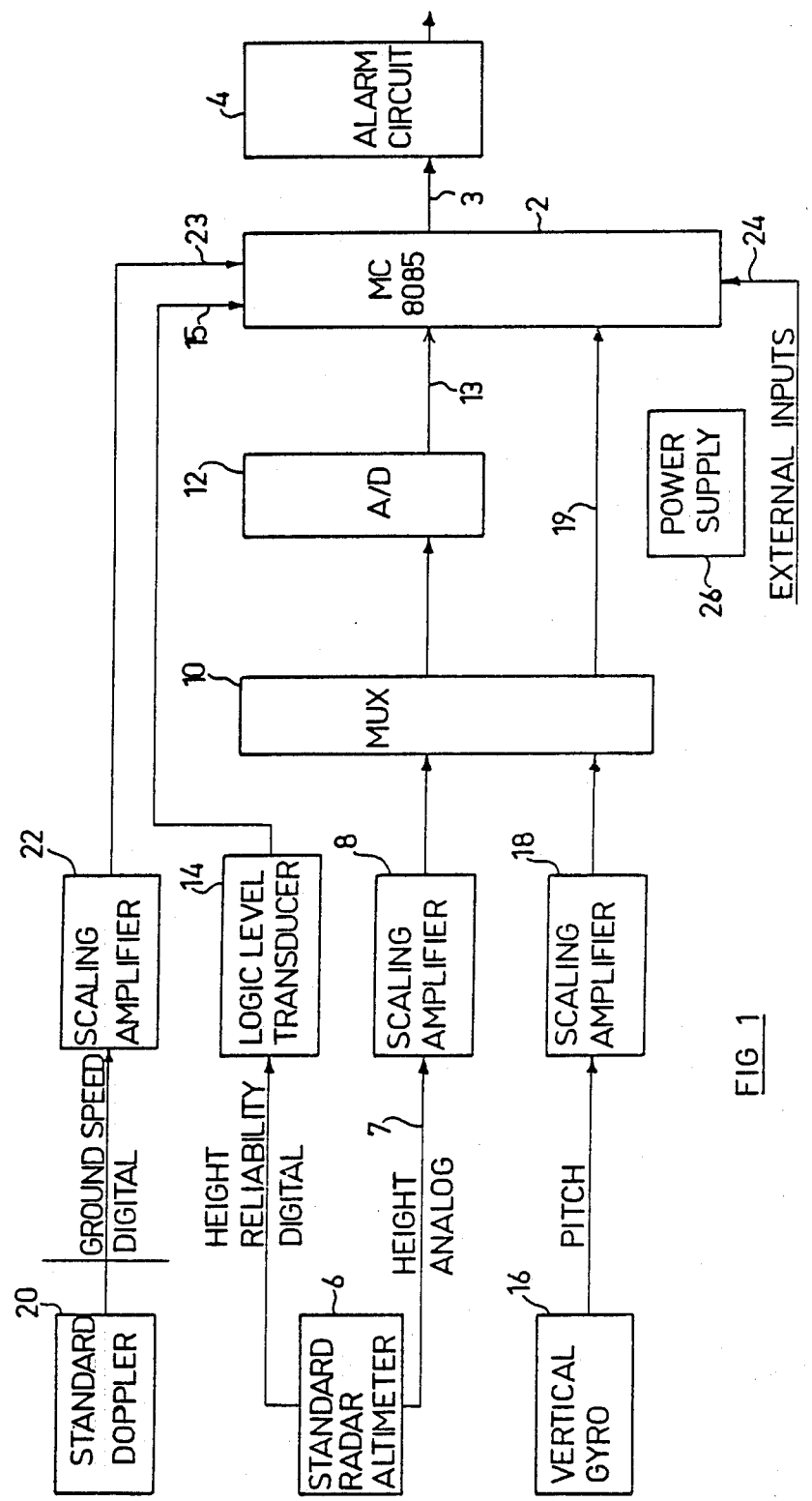
FIG. 1 is a block diagram illustrating one form of excessive ground-closure rate alarm system constructed in accordance with the present invention particularly useful for helicopters.

With reference first to FIG. 1, the overall system includes a digital microcomputer 2 which is preprogrammed before flight (actually at the factory), and which, in response to a plurality of inputs during flight, controls, via its output 3, an alarm circuit 4 to actuate an alarm when the computed ground-closure rate is excessive for the computed height of the aircraft. The inputs to this microcomputer 2 for this purpose are as follows:

1. The height or altitude of the aircraft, this being measured by a standard radar altimeter 6 producing an analog output 7 which is fed via scaling amplifier 8, multiplexer 10, and analog-to-digital converter 12, to the input bus 13 of the microcomputer 2;

2. A height reliability digital signal also outputted by the standard radar altimeter 6, which signal is fed via a logic level transducer 14 to the input bus 15 of the microcomputer 2;

3. The pitch of the aircraft, this being measured by a vertical gyro 16 which produces a digital signal fed via scaling amplifier 18 and multiplexer 10 to the input bus 19 of the microcomputer 2; and 4. The ground speed of the aircraft, this being measured by a standard Doppler unit 20 producing a digital signal fed via scaling amplifier 22 to the input bus 23 of the microcomputer.

Microcomputer 2 may include further input, e.g., as supplied from other measuring instruments or sensors commonly included in helicopters for purposes of control or indication, such other signals being inputted into the microcomputer via its external input bus 24. FIG. 1 also illustrates the power supply 26 for supplying power to the various electronic components included in the illustrated system.

Figure 2:
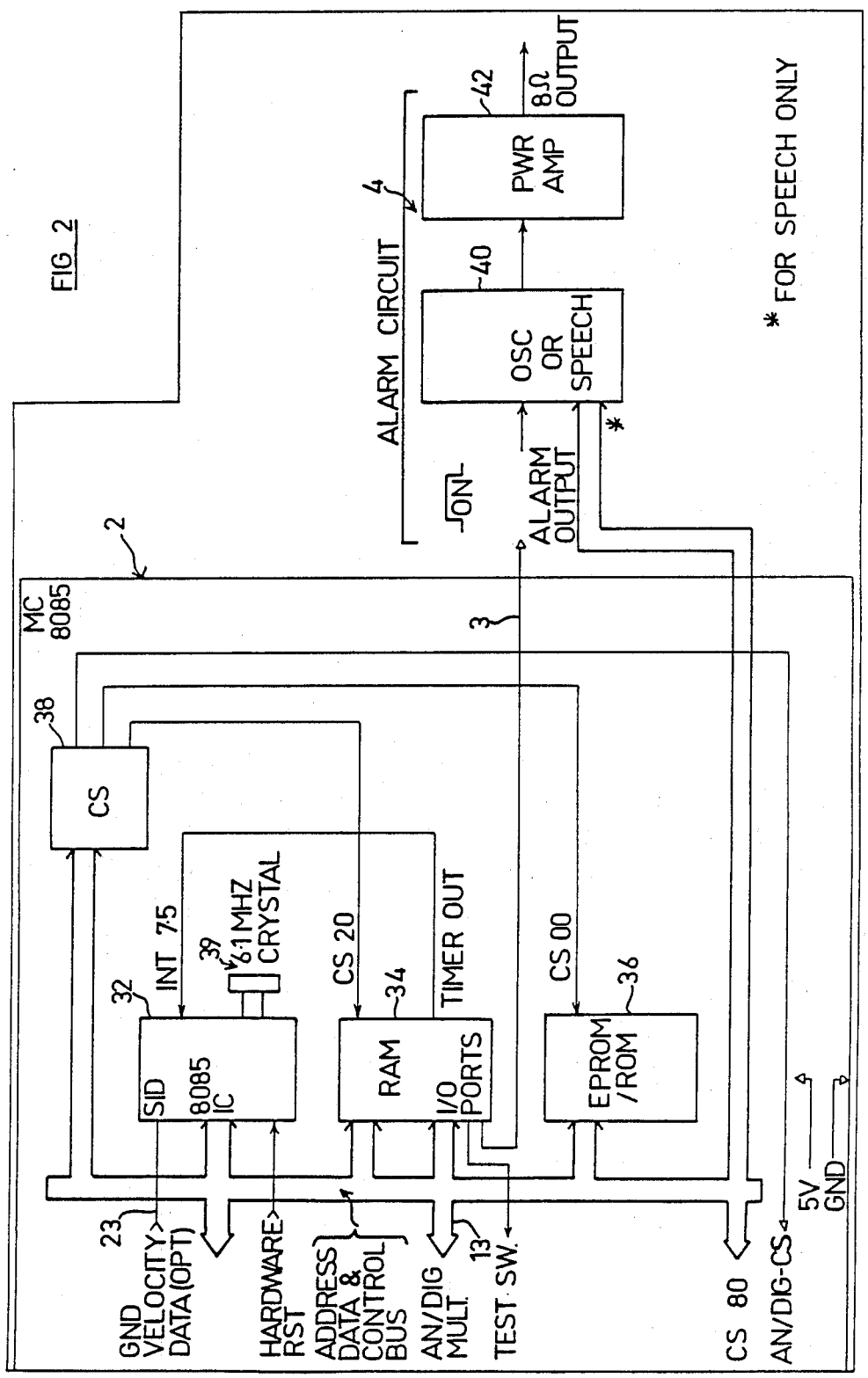
FIG. 2 is a block diagram particularly illustrating the microcomputer, including its inputs and outputs, in the system of FIG. 1.

The main components of the microcomputer 2, and some of its input/output connections, are more particularly illustrated in FIG. 2. Thus, it will be seen that the microcomputer 2 includes a CPU (central processor unit) 32, a RAM (Random Access Memory) 34, an EPROM/ROM (Erasable Programmable Read Only Memory) 36, and a control system 38. The CPU 32 is controlled by a 6.1 MHZ crystal 39 and receives the ground velocity signal via its input lead 23. The RAM 34 is used for temporary storage of the computation results and receives the output from the multiplexer 10 and analog-to-digital converter 12 via the CPU 32 and its input bus 13. The EPROM unit 36 stores the operating program and also a look-up table setting forth the alarm envelope in determining whether the computed ground-closure rate is excessive for the particular altitude of the aircraft. This alarm envelope will be described more particularly below with reference to FIGS. 3 and 4.

The alarm circuit 4 controlled by the microcomputer 2 includes an oscillator or speech sounding unit 40 whose output is amplified by a power amplifier 42. The alarm circuit 4 could, of course, include indicator lights or other alarm-indicating devices.

The Alarm Envelope

Figure 3:
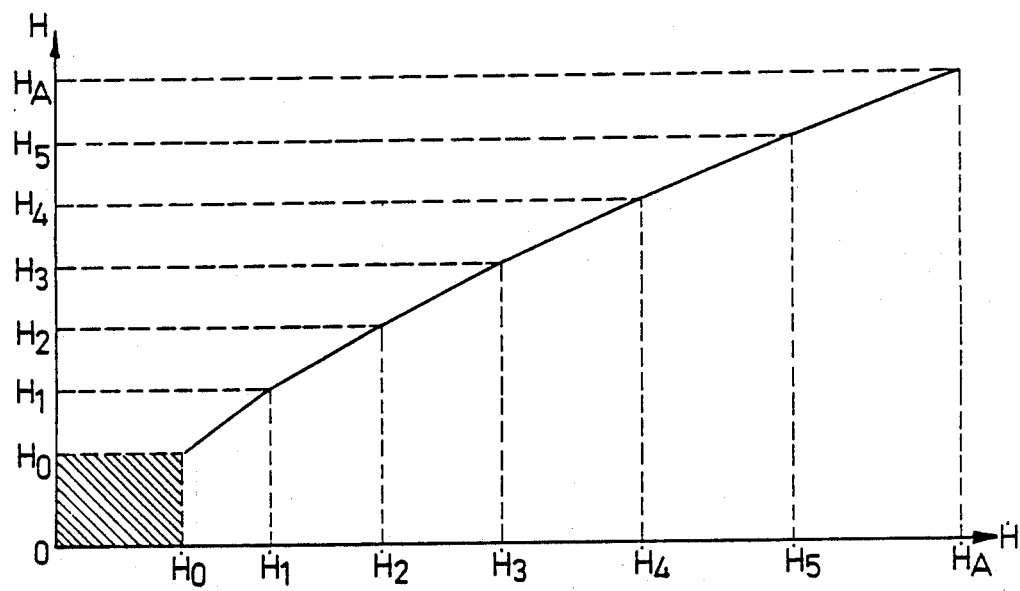
FIG. 3 illustrates the alarm envelope stored in the system of FIG. 1 which is used to produce an alarm when the computed ground-closure rate of the aircraft has been found to be excessive for the particular altitude.

FIG. 3 illustrates the alarm envelope which defines the relationship of ground-closure rate ($\dot{H}$) with respect to altitude or height (H) actuating the alarm and which is stored as a look-up table in EPROM 36 of the microcomputer 2 with specified parameters applicable to that particular aircraft. Most of the alarm envelope, i.e., above a predetermined altitude (Ho), is based only on a relationship between altitude and ground-closure rate and is independent of ground speed; but below this predetermined altitude (Ho), the ground speed becomes a parameter. The latter portion of the alarm is represented by the sectioned rectangular area in FIG. 3, and is more particularly illustrated in enlarged form in FIG. 4.

First, with respect to the portion of the alarm envelope above the predetermined altitude Ho, it will be seen from FIG. 3 that the curve is constituted of a plurality of substantially linear segments, thereby indicating a substantially linear relationship between altitude (H) and ground-closure rate ($\dot{H}$). It will be seen in the example illustrated in FIG. 3 that the inclination of each of these linear segments gradually decreases from the lower altitudes to the higher altitudes. Thus, the inclination of the lowest line segment $H_o$-$H_1$ is of largest inclination, and the highest line segment $H_5$-$H_4$ is of smallest inclination, thereby indicating that the permissible ground-closure rate is greatest at the highest altitudes and gradually decreases towards the lower altitude up to the predetermined altitude Ho.

With respect to the portion of the alarm envelope below the predetermined altitude Ho (which portion is represented by the sectioned rectangular area in FIG. 3), it will be seen from FIG. 4 that this portion of the alarm envelope is defined by a family of curves, in the form of substantially straight lines but of different inclinations, in which ground speed (V) is a parameter. This family of lines represents the lower portion of the alarm envelope at different ground speeds, from 0 (V =0) wherein the envelope line is of highest inclination thereby indicating a large permissible ground-closure rate with respect to altitude, to a predetermined maximum ground speed (V =Vm) of smallest inclination, thereby indicating a small permissible ground-closure rate with respect to altitude.

Figure 4:
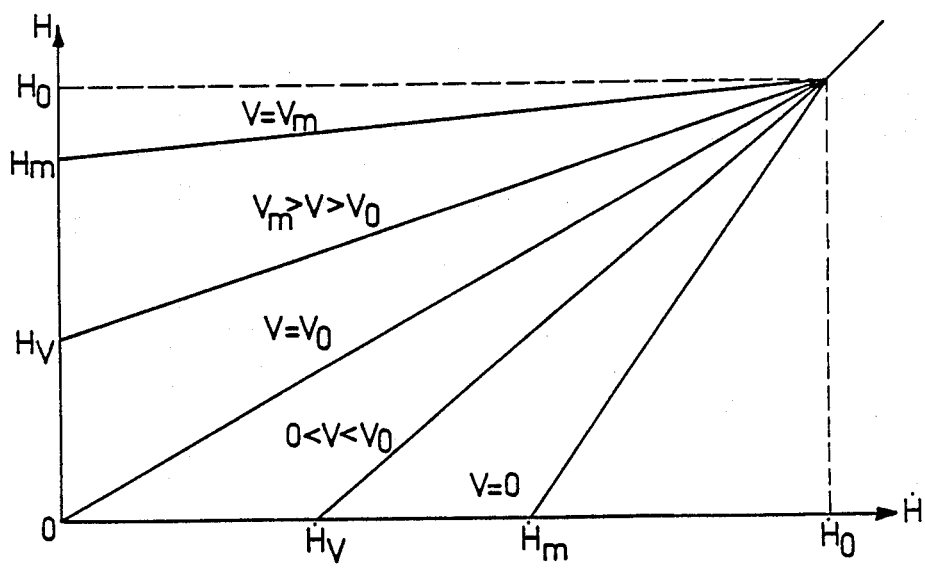
FIG. 4 is an enlarged showing of the lower part of the alarm envelope of FIG. 3, in which part ground speed of the aircraft is a parameter.

The various designations illustrated in FIG. 4 are defined as follows:

Ho—the predetermined altitude below which the ground-closure rate becomes dependent upon ground speed;

$\dot{H}o$—the permissible ground closure rate at altitude Ho;

Vm—the maximum possible ground speed of the helicopter;

Hm—the minimum altitude at the maximum ground speed Vm;

$\dot{H}m$—maximum ground-closure rate at landing with zero ground speed (V=0);

Vo—maximum ground speed at landing (with 0 ground-closure rate);

Hv—minimum altitude at ground speed greater than Vo but less than Vm (Vm>V>Vo);

$\dot{H}v$—maximum ground-closure rate at landing with ground speed (V) greater than 0 but less than VO (O<V<Vo).

The values Ho, Hm, and $\dot{H}m$ and Vo are inputted at the factory into the microcomputer as constant parameters applicable to that aircraft. As one example applicable, e.g., to the Bell Helicopter 212, Ho may equal 35 feet, Hm may equal 30 feet, $\dot{H}m$ may equal 30 feet/minutes, and Vo may equal 5 knots.

The two parameters Hv and $\dot{H}v$ are calculated as follows:

$$HV = HM(V-VO)/Vm-VO \text{ for } V > Vo$$

$$\dot{H}V = \dot{H}m(Vo-V)/Vo \text{ for } V > Vo$$

The Microcomputer 2 Program

As will be described more particularly below, the microcomputer 2 is preprogrammed before flight (usually at the (factory) to store in the EPROM the look-up table defining the alarm envelope illustrated in FIGS. 3 and 4, and also to store the above parameters related to the lower portion of this alarm envelope (FIG. 4) in which ground speed is a parameter. During the flight, the microcomputer continuously computes the alarm envelope from the altitude and ground-closure rate, and also from the ground speed when the aircraft is below the predetermined altitude Ho. That is to say, at altitudes above Ho, ground speed is ignored; but at altitudes below Ho, the ground speed is included as a parameter, and this portion of the alarm envelope is represented by a substantially straight line having an inclination depending upon the measured ground speed.

Microcomputer 2 is preprogrammed, by the operating program stored in EPROM 36, according to a main cycle illustrated by the block diagram in FIG. 5, which main cycle is continuously repeated once during a time interval which is small compared to a typical pilot's reaction time. For example, a typical pilot's reaction time is about 1.0 seconds, and therefore the main cycle illustrated in FIG. 5 would be repeated, e.g., every 0.1 seconds. As will be described below, the program compensates for the pilot reaction time by computing, from the measured altitude, the anticipated or predicted altitude of the air craft after the lapse of a predetermined time delay corresponding to the pilot's reaction time.

Main Computer Cycle

As illustrated in FIG. 5, the main cycle of the computer program includes five main routines, namely: A1, updating the altitude set; A2, computing the ground-closure rate and altitude expected after pilot's delay; A3, entering the ground speed; A4, computing the alarm envelope; and A5, producing an alarm if needed. The foregoing routines, together with their applicable subroutines, are illustrated in FIGS. 6–23.

FIG. 6 illustrates routine A1 for updatng the altitude set, wherein it will be seen that this routine includes the subroutines: A1.1, for computing the average altitude value; A1.2, for shifting both altitude sets; and A1.3, for sampling the primary set of altitude values.

Figure 7:
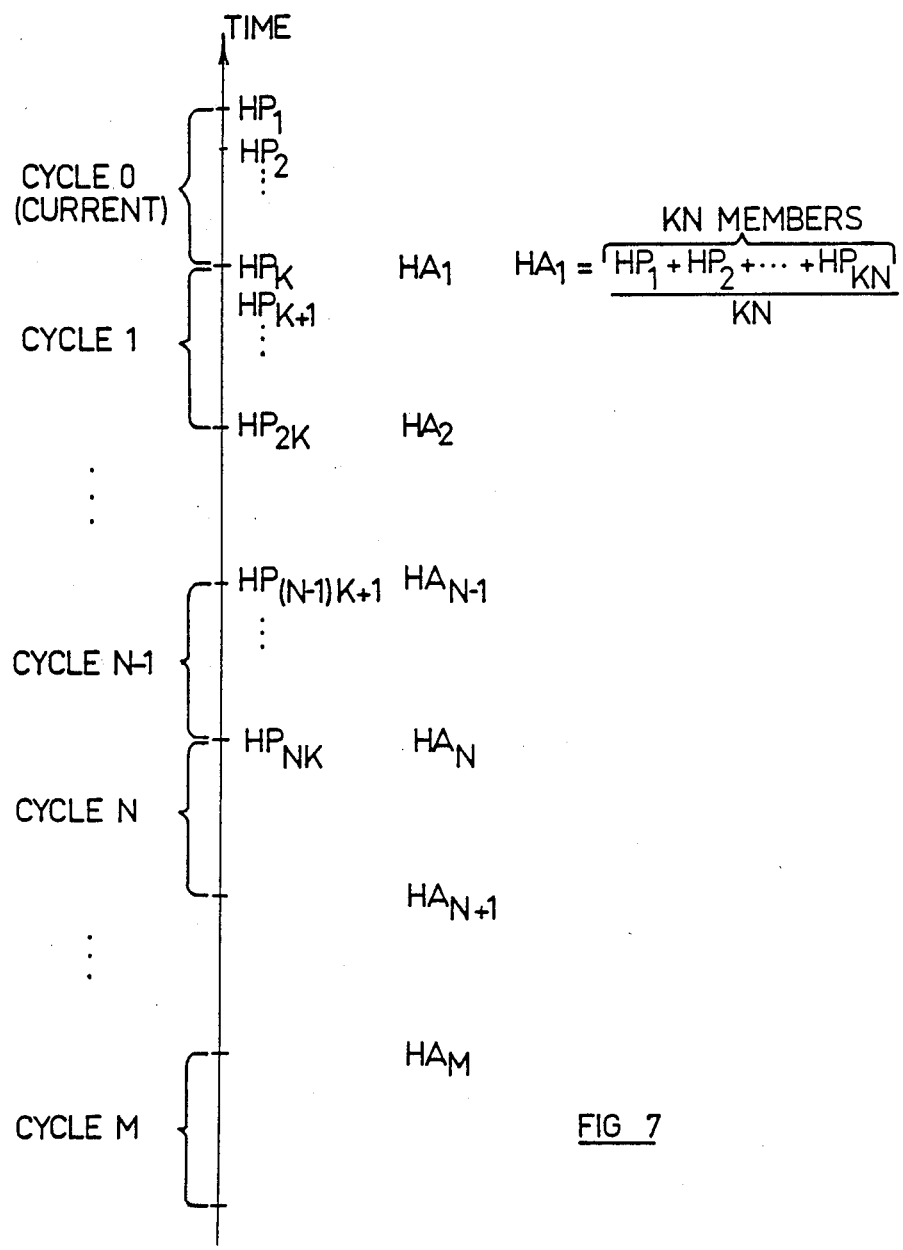
FIG. 7 is a measuring and averaging timing diagram helpful in understanding the "Update Altitude Set" operation of FIG. 6.
Figure 8:
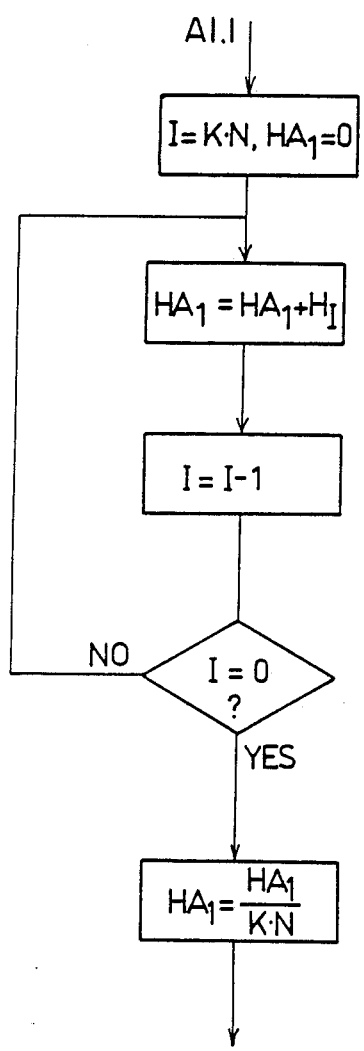
FIGS. 8-10 are diagrams more particularly illustrating the three suboperations of the "Update Altitude Set" operation of FIG. 6.
Figure 9:
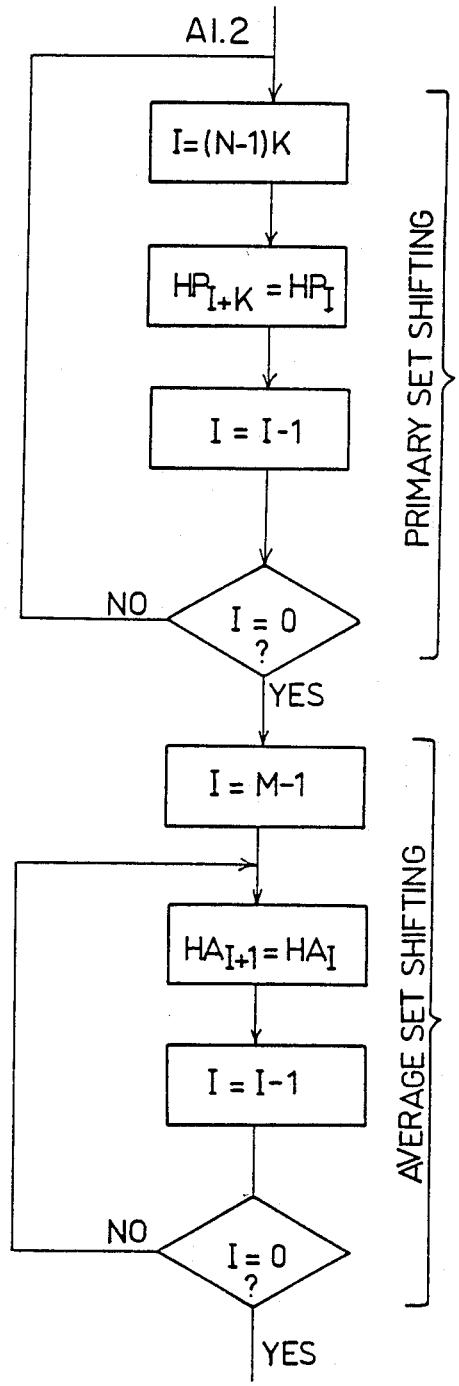
Figure 10:
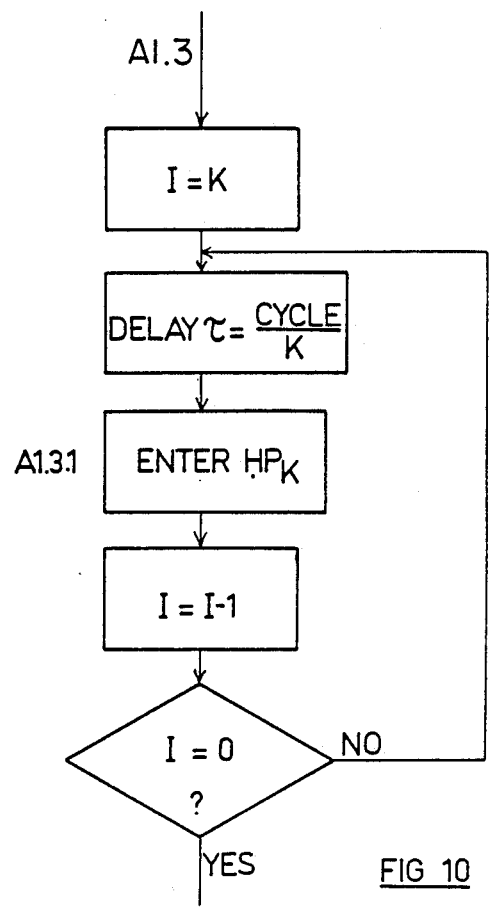

FIG. 7 illustrates the measuring and timing diagram for performing these subroutines; and FIGS. 8, 9, and 10, respectively, illustrate the above subroutines of FIG. 6. As shown by these figures, the altitude value is measured several times (K) during a main cycle (T), and the results $HP_1, \ldots HP_K$ are stored for a time interval which is less than the pilot's reaction delay (e.g., 1.0 sec.). The primary altitude set $HP_1, \ldots HP_{N \cdot K}$ is thus constituted of these K·N values. As one example, T=0.1 sec., K=4 and N=6, so that K·N=24.

The average values of the primary altitude set as computed above in every cycle are stored for a plurality (M) cycles according to the measuring and averaging time diagram illustrated in FIG. 7, wherein it will be seen that at the beginning of each cycle, the average of the last K·N values is computed.

The average altitude value is then computed in the manner illustrated in FIG. 8, and both altitude sets are then shifted, in the manner illustrated in FIG. 9, every value being changed by the corresponding one from the next cycle. Finally, the primary set of altitude values is sampled in the manner illustrated in FIG. 10.

Compensating for Aircraft Orientation

Figure 11:
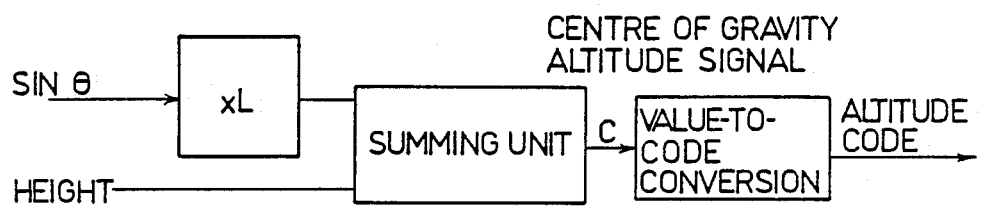
FIG. 11 illustrates an arrangement for hardware compensating for the orientation of the aircraft when measuring altitude.

FIG. 11 illustrates one manner for producing the altitude values in order to compensate for aircraft orientation. Thus, the altitude-measuring instrument is a radar altimeter carried on the aircraft at a distance (L) from the center of gravity (CG) of the aircraft. The alarm envelope illustrated in FIGS. 3 and 4 is based on the altitude of the CG of the aircraft, and therefore it is advantageous, particularly when the system is used in helicopters, to compensate for the pitch of the aircraft.

As shown in FIG. 11, the vertical gyro 16 outputs a signal representing the sine of the pitch ($\theta$) which is multiplied by the distance (L) between the radar altimeter and the CG of the aircraft, thereby producing a compensation value (L $\sin\theta$) representing the vertical height (which may be positive or negative, depending on the orientation of the aircraft) of the radar altimeter with respect to the aircraft CG. This compensation value is summed with the altitude measured by the altimeter 6 (analog output 7) before this value (C) is introduced into the analog-to-digital converter 12 (FIG. 1) for conversion to digital form before being inputted into the microcomputer 2.

It will be appreciated that this compensation can also be done by a software programming of the microcomputer 2, rather than by the hardware arrangement illustrated in FIG. 11. Thus, the pitch signal from the vertical gyro 16 could be converted to digital form and introduced, with the digital form of the altitude from the altimeter 6, into the microcomputer 2 wherein this information would be processed to provide the above-described compensation for the aircraft orientation; alternatively, the pitch signal from the vertical gyro 16 could be introduced in digital form merely as the pitch angle, and the microcomputer could be programmed to compute the sine of this pitch angle, as well as the other computations in order to compensate the measured altitude for aircraft orientation, as described above.

Predicted Ground-Closure Rate and Altitude

Figure 12:
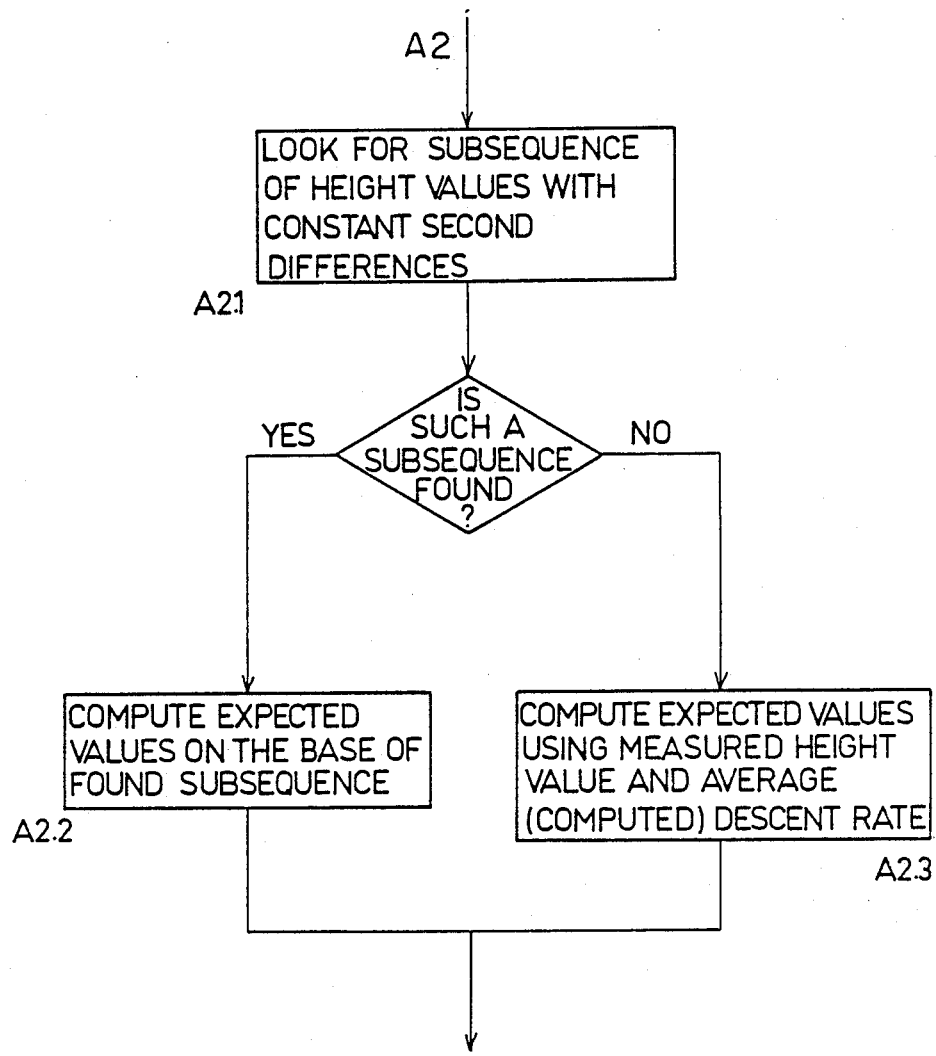
FIG. 12 is a flow diagram illustrating the second operation in the main cycle diagram of FIG. 5.

The procedure for performing the prediction operation A2 of the main cycle illustrated in FIG. 5, namely for computing the ground-closure rate and altitude expected after the pilot's delay, is illustrated in FIG. 12; and the various subroutines involved in that procedure are illustrated in FIGS. 13–18.

Briefly, the prediction is performed in several steps, as follows:

1. The average altitude set is studied for a tendency;
2. If this set, or any of its subsets corresponding to at least one-half the pilot's reaction time delay, is characterized by a zero or a substantially constant acceleration (the second difference of the altitude with respect to time), then this value of the second difference, the values of the first difference (corresponding to vertical velocity), and the value of the altitude, form the basis for the prediction;
3. If, however, neither the mentioned above set, nor any of its consequent subsets, is characterized by a zero or constant vertical acceleration, then the average ground-closure rate value for the last interval of about one-half of the pilot's reaction time is used for the prediction, as it is assumed to be constant for the prediction interval.

Figure 13:
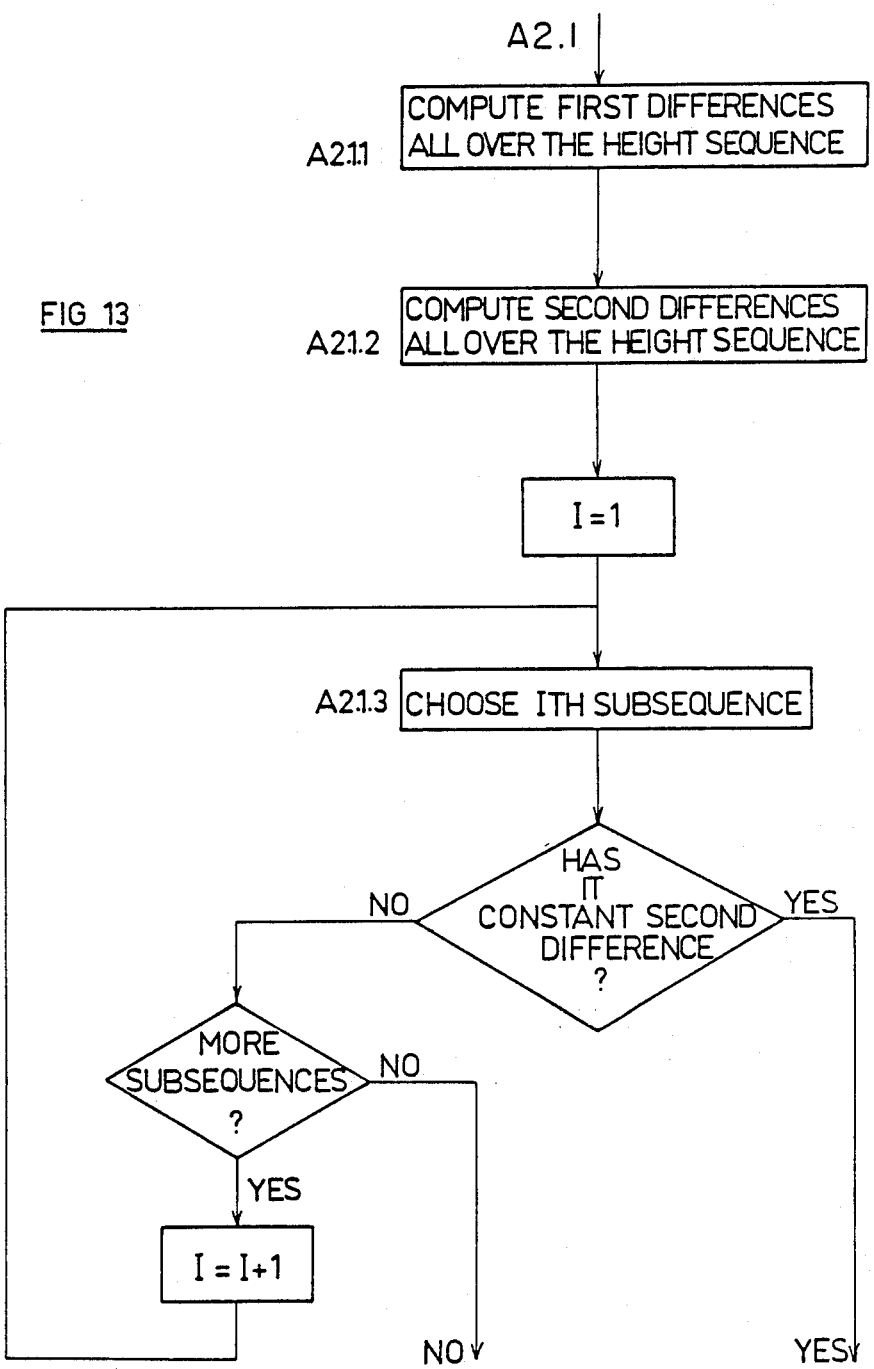
FIGS. 13-18 are diagrams more particularly illustrating the various suboperations performed in performing the operation illustrated in FIG. 12.
Figure 14:
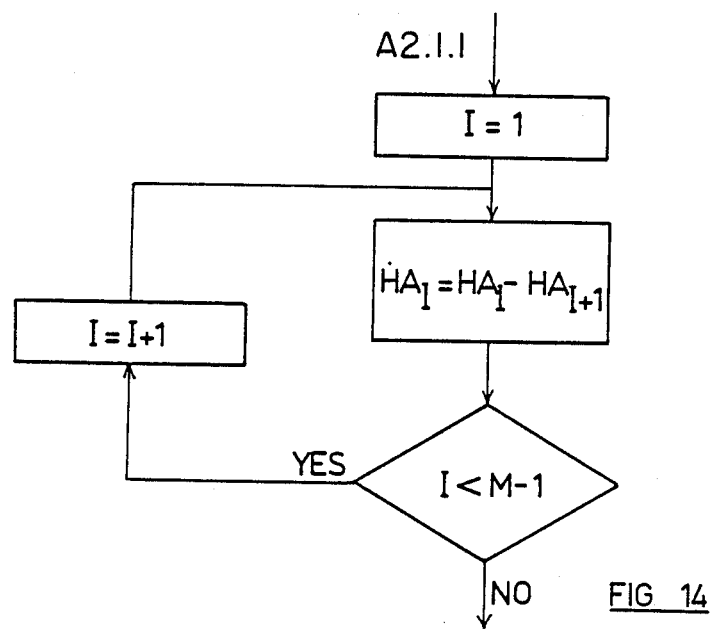
Figure 15:
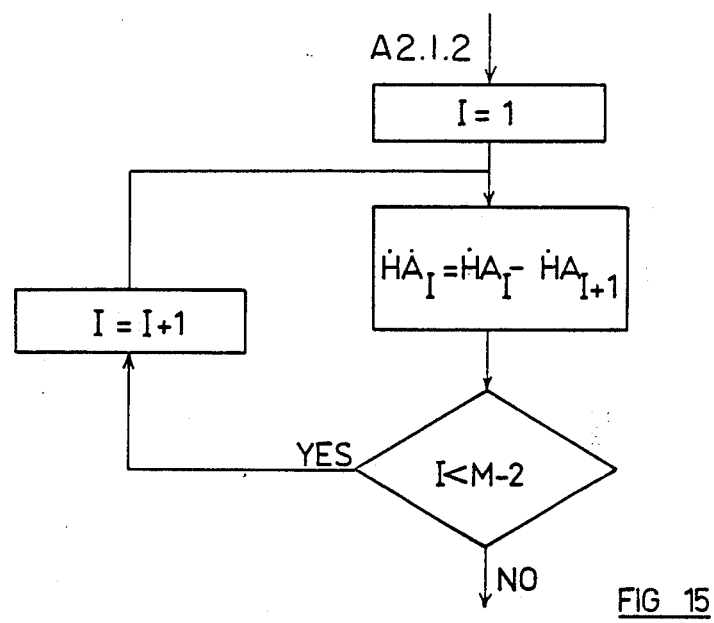
Figure 16:
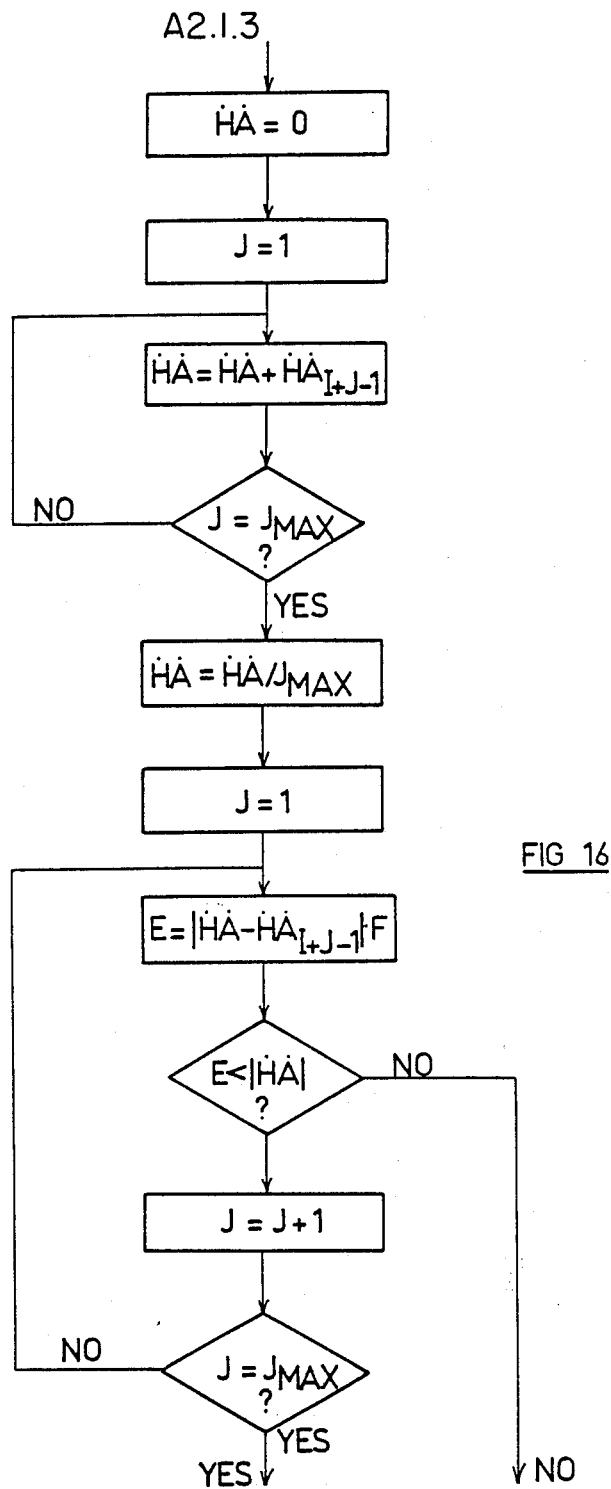

Thus, the subroutine of FIG. 13 illustrates how procedure A2.1 is performed, namely to look for subsequence of altitude values with constant second difference. The subroutines for performing this procedure are illustrated in FIGS. 14–16, wherein FIG. 14 illustrates procedure A2.1.1 for computing the first differences all over the altitude sequence; FIG. 15 illustrates procedure A2.1.2 for computing the second differences all over the altitude sequence; and FIG. 16 illustrates procedure A2.1.3 for choosing the $I^{th}$ sub-sequence and determining whether it has a constant second difference. With reference to FIGS. 14–16, the following definitions are employed: $HA_I$ - average value in $I^{th}$ cycle; M - number of values $HA_I$ stored in memory; $HA_I = HA_I - HA_{I+1}$; HA-temporary results cell, after division by $I_{MAX}$ - average second difference of $I^{th}$ subsequence.

Figure 17:
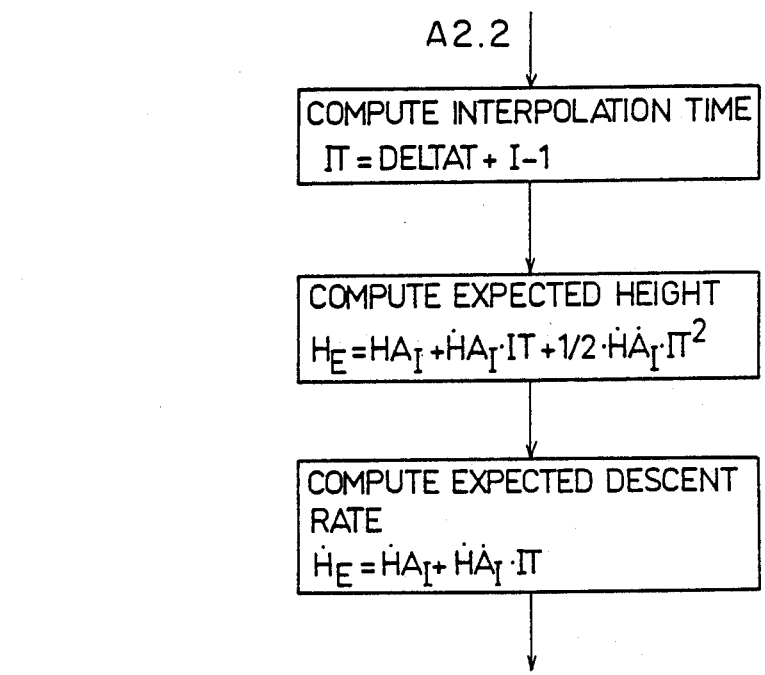
Figure 18:
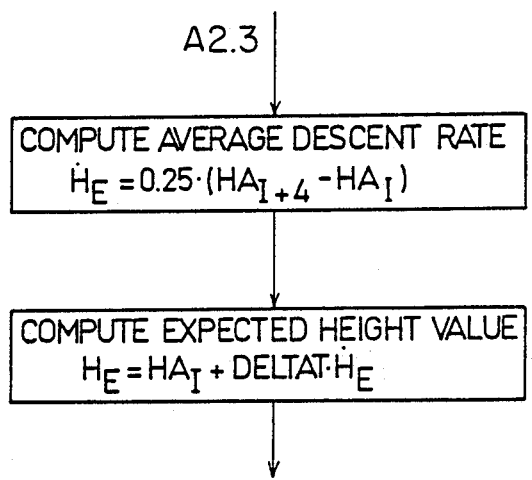

FIG. 17 illustrates procedure A2.2 of FIG. 12 for computing the expected values on the basis of the found subsequence; and FIG. 18 illustrates procedure A2.3 of FIG. 12 for computing the expected values using measured altitude and computed average ground-closure rate.

Computing the Alarm Envelope

Figure 19:
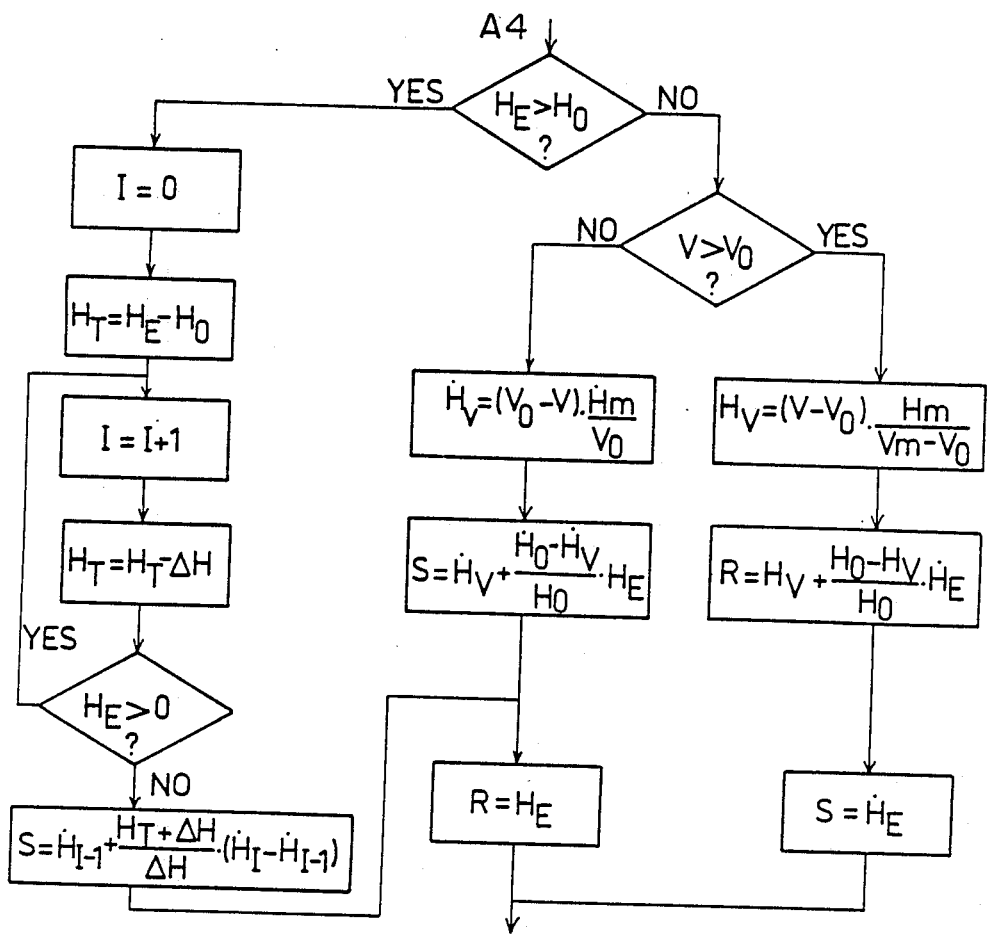
FIG. 19 is a diagram illustrating the manner of performing the "Compute Alarm Envelope" operation in the main cycle of FIG. 5.

FIG. 19 illustrates the procedure for computing the alarm envelope as illustrated in FIGS. 3 and 4 and described above. In this case, altitude he is the expected or predicted altitude as computed in accordance with procedures A1 and A2 described above in order to compensate for the pilot's reaction time. Similarly, the value $\dot{H}_E$ is the predicted ground-closure rate at the predicted altitude.

Thus, the first step is to compare whether the predicted altitude is above or below the predetermined altitude Ho above which ground speed is not a parameter in the alarm envelope, and below which (represented by the sectioned area in FIG. 3 and the enlarged illustration in FIG. 4) wherein ground speed is a parameter. If the predicted altitude is above the predetermined altitude Ho, then the procedure proceeds according to the leftmost sequence wherein ground speed is not a factor.

However, if the predicted altitude is not above the predetermined altitude Ho, then the ground speed becomes a factor, and the first thing is to determine whether the measured ground speed is greater than Vo, namely the maximum permitted ground speed at landing (e.g., with 0 ground-closure rate). If V is less than Vo, then the aircraft may land, but the maximum ground-closure rate depends on the ground speed. This is determined according to the middle sequence illustrated in FIG. 19, which first determines the permitted ground-closure rate ($\dot{H}_V$) at landing, and then by interpolation, the maximum closure rate at the predicted altitude for the respective ground speed.

If the measured ground velocity is greater than $V_o$ (the highest ground speed at which the aircraft may land), then the system operates according to the rightmost sequence of steps, wherein first there is computed the lowest altitude at the measured ground speed (V), and then is determined the lowest altitude permitted when flying at the measured ground speed and at the predicted closure rate ($\dot{H}_E$).

Producing the Alarm

Figure 22:
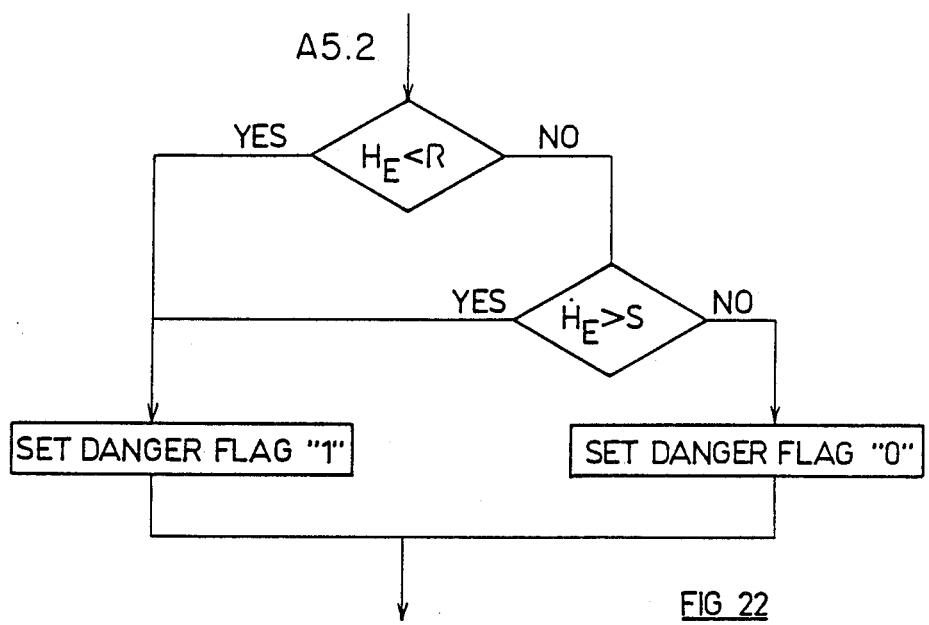

The parameters R and S outputted from the procedures illustrated in FIG. 19 are used in procedure A5, as particularly in the subroutine illustrated in FIG. 22, which produces the alarm if the aircraft is in the warning region of the alarm envelope.

The alarm (circuit 4 in FIG. 1) is not immediately actuated the instant an alarm condition is sensed, but rather an alarm flag is set, and the alarm is actuated only when a predetermined number of alarm flags have been set during a predetermined number of cycles. Thus, a danger flag is set when in the corresponding cycle, the conjunction of the predicted altitude and ground-closure rate (together with ground speed if the predicted altitude is below Ho), indicates that the aircraft is in the warning (inner) region of the alarm envelope illustrated in FIGS. 3 and 4. The microcomputer includes a plurality of such danger flags about equal in number to the pilot's reaction delay per cycle. In our example, therefore, the pilot's reaction delay is taken as one second, and each cycle is 0.1 sec., so that there would be 10 such danger flags. In this example, the alarm is actuated only when at least 7 of such danger flags have been set during the previous P (10) cycles, and is de-actuated only when 5 of such flags have been reset during the previous P cycles. It has been found that this arrangement substantially reduces false alarms, and thereby enhances the integrity of the alarm when it is actuated.

Figure 20:
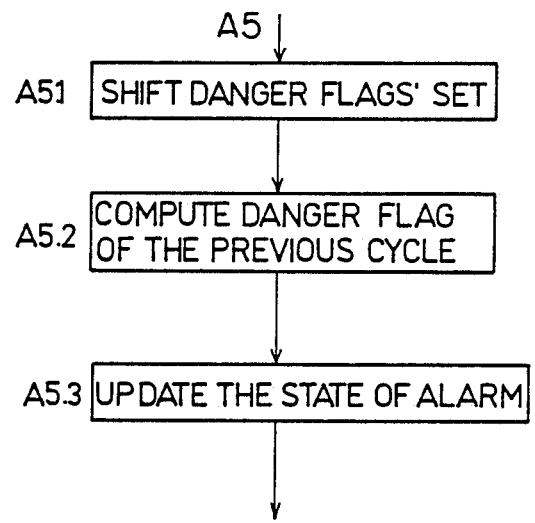
FIGS. 20-23 are diagrams illustrating the manner of performing the "Produce Alarm if Needed" operation in the main cycle diagram of FIG. 5.
Figure 21:
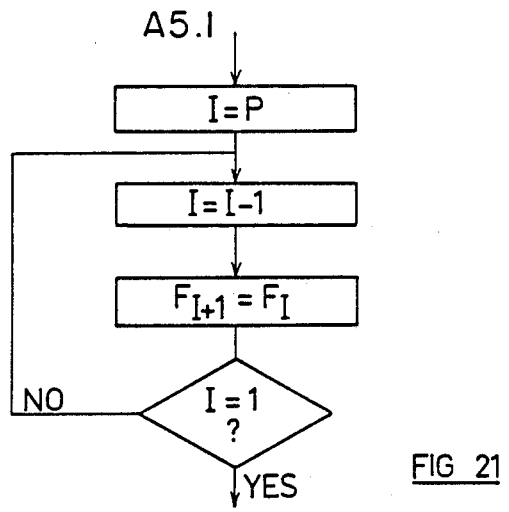

FIG. 21 illustrates the procedure for performing operation A5.1 of FIG. 20, namely for shifting the danger flags' set, wherein $F_i$ is the danger flag in cycle I. FIG. 22 illustrates the procedure for performing operation A5.2 of FIG. 20, wherein the inputs R, S are the outputs of the procedure illustrated in FIG. 19 for computing the alarm envelope, $H_E$ being the predicted altitude value, and $\dot{H}_E$ being the predicted ground-closure rate. The "R" in the first decision block in the minimum permissible altitude in the case when V>Vo (making the rightmost sequence of steps in FIG. 19 effective), so that a "YES" output from that decision block is effective to set the danger flag "I". A "NO" output from this first decision block covers the other two situations illustrated in FIG. 19, so that a "YES" output from the second decision block ($\dot{H}_E$>S) is also effective to set the danger flag "1", whereas a "NO" output means there is no danger and the danger flag is therefore set "O".

Figure 23:
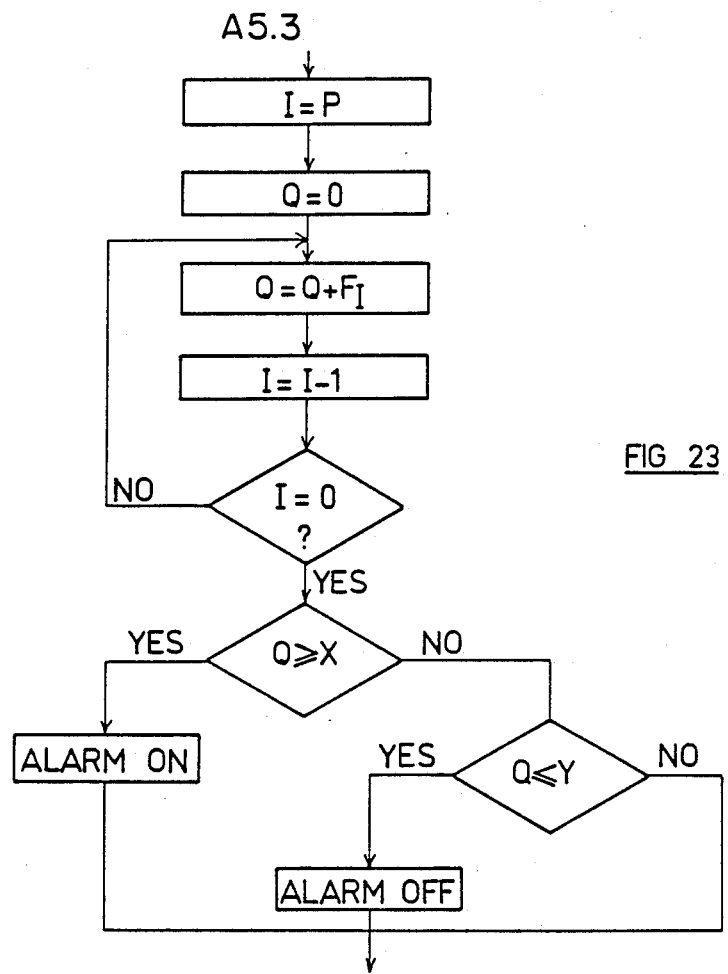

FIG. 23 illustrates procedure A5.3 of FIG. 20, namely for updating the state of the alarm, wherein "X" indicates the specified minimum number of cycles of the last "P" cycles that the danger flag has been set to "1" before an alarm issues and "Y" indicates the number of cycles of the last "P" cycles in which the danger flag has been set to "O" before stopping the alarm. In the example mentioned above, "P" may be equal to 10; "X" may be equal to 7; and "Y" may be equal to 5. Thus, the first part of the procedure illustrated in FIG. 23 determines how many times the danger flag was set for "1" in the last "P" cycles; and the second part of the procedure indicates that if this number (Q) is equal to or greater than 7, the alarm is actuated; if this number is less than 7, but greater than 5, there is no change in the alarm (i.e., if the alarm was "on" it will stay "on"); and if this number (Q) is less than or equal to 5, the alarm will be turned off. This arrangement thus provides the alarm control system with "hysteresis" between alarm turn-on and alarm turn-off, to avoid "hunting" about the turn-on point, which thereby enhances the integrity of the alarm when actuated.

It will be appreciated that a number of microcomputers, and also the techniques for programming them, are presently known for performing the operations described above, and therefore further details in the construction or programming of such microcomputers are not necessary. As one example, there may be used the Intel microcomputer 8085.

While the invention has been described with respect to one preferred embodiment, it will be appreciated that many variations, modifications, and other applications of the invention may be made.

We claim:

1. An excessive ground-closure rate alarm system for aircraft, comprising:

altitude measuring means for measuring the altitude of the aircraft;

means for computing therefrom the ground-closure rate; and alarm means for producing an alarm when the computed ground-closure rate is excessive for the particular altitude, characterized in that said alarm means includes a digital microcomputer having a memory and being operative to cause the means for measuring the altitude of the aircraft to repeatedly measure the instantaneous altitude of the aircraft and compute a sequence of average altitudes and a value representing the vertical acceleration of said aircraft between successive ones in said average altitude sequence, said computation being used to further compute a predicted aircraft altitude and ground-closure rate after the elapse of a predetermined time delay to compensate for the pilot's reaction time, said alarm means being further characterized in that said memory contains a look-up table defining an alarm envelope which, above a predetermined altitude, is based on a relationship between the predicted altitude and ground-closure rate which is independent of ground velocity, and below said predetermined altitude, is based on a relationship between the predicted altitude and ground-closure rate which is dependent on ground velocity, said relationship being defined by a plurality of lines, each line corresponding to a different ground speed varying from zero ground speed to a specified maximum ground speed, said microcomputer being pre-programmed with information specifying the maximum ground speed at landing with zero ground-closure rate, a maximum ground-closure rate at landing with zero ground speed, and minimum altitude at specified maximum ground speed, said alarm means setting an alarm flag when the aircraft is within the alarm envelope, said alarm means being actuated only when a first predetermined number, greater than one, of alarm flags have been set during a second predetermined number of previous altitude measurements.

2. The system according to claim 1, wherein said microcomputer memory is programmed to store a look-up table defining an alarm envelope which, above said predetermined altitude, is constituted of a plurality of segments each having a substantially linear relationship between altitude and ground-closure rate.

3. The system according to claim 1, wherein said system further includes means for correcting the measured altitude by compensating for the aircraft orientation.

4. The system according to claim 3, wherein said altitude measuring means includes a radar altimeter carried on the aircraft, and wherein said correcting means includes:

aircraft pitch measuring means for measuring the pitch of the aircraft;

means for determining from the measured pitch of the aircraft the height of the altimeter with respect to the center of gravity of the aircraft; and means for summing the height of the altimeter with respect to the center of gravity of the aircraft with the altitude of the aircraft as measured by the altimeter to provide an output indication of the altitude of the center of gravity of the aircraft.

5. The system according to claim 1, wherein said digital microcomputer further includes means for turning-off the alarm when less than a third predetermined number of alarm flags, being less than said first predetermined number of alarm flags, have been set during said second predetermined number of previous altitude measurements.

6. The system according to claim 5, wherein said second predetermined number of previous cycles is "10", said first predetermined number of flags for actuating the alarm is "7" and said third predetermined number of flags for turning-off the alarm is "5".

* * * * *

UNITED STATES PATENT AND TRADEMARK OFFICE
CERTIFICATE OF CORRECTION

PATENT NO. : 4,868,916
DATED : September 19, 1989
INVENTOR(S) : Boris Ablov and Mosag Sabato It is certified that error appears in the above-identified patent and that said Letters Patent is hereby corrected as shown below:

Column 2, line 19, replace "a" with --an ARDAS general--,

Column 2, line 33, immediately following "parameter" insert --,including the "Part Of Alarm Envelope That Depends On Ground Speed"--, Column 2, line 43, immediately following "Fig. 6" insert --, including "Compute Average Set", Fig. 8, "Shift Both Altitude Sets", Fig. 9, and "Sample Primary Set Of Altitude Values", Fig. 10 --, Column 2, line 48, immediately following "Fig. 5" insert --, including "Compute Descent Rate And Altitude Expected After Pilot's Delay" --, Column 2, line 51, immediately following "Fig. 12" insert --, including "Look For Subsequence Of Height Values With Constant Second Differences", Fig. 13 "Compute First Differences All Over The Height Sequence", Fig. 14, "Compute Second Differences All Over The Height Sequence", Fig. 15, "Choose ITH Subsequence, Has It Constant Second Difference? ", Fig. 16, "Compute Expected Values On The Base Of, Found Subsequence", Fig. 17 and "Compute Expected Values Using A Measured Height And Computed Average Descent Rate", Fig. 18 --, Column 2, line 57, immediately following "Fig. 5" insert --, including "Produce Alarm If Needed", Fig. 20, "Shift Danger Flags Set", Fig. 21, "Compute Danger Flag Of The Previous Cycle", Fig. 22, and "Update The State Of Alarm", Fig. 23 --.

UNITED STATES PATENT AND TRADEMARK OFFICE
CERTIFICATE OF CORRECTION

PATENT NO. : 4,868,916

DATED : September 19, 1989

INVENTOR(S) : Boris Ablov and Mosag Sabato

It is certified that error appears in the above-identified patent and that said Letters Patent is hereby corrected as shown below:

Column 4, line 57, should read: --$\dot{H}v=\dot{H}m(Vo-V)/Vo$ for $V<Vo$--.

Column 7, line 16, delete "he" and substitute --$H_E$--,

Column 8, line 21, delete "$H_E$" and substitute --$\overset{a}{H}_E$--.

Signed and Sealed this

Ninth Day of June, 1992

Attest:

DOUGLAS B. COMER

Attesting Officer

Acting Commissioner of Patents and Trademarks